(12) United States Patent
Mori

(10) Patent No.: US 12,544,555 B2
(45) Date of Patent: Feb. 10, 2026

(54) PUMP DEVICE FOR PUMPING BLOOD

(71) Applicant: TERUMO KABUSHIKI KAISHA, Tokyo (JP)

(72) Inventor: Takehisa Mori, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 1122 days.

(21) Appl. No.: 17/527,224

(22) Filed: Nov. 16, 2021

(65) Prior Publication Data

US 2022/0072296 A1   Mar. 10, 2022

Related U.S. Application Data

(63) Continuation of application No. PCT/JP2020/011198, filed on Mar. 13, 2020.

(30) Foreign Application Priority Data

Jun. 19, 2019   (JP) .................................. 2019-113877

(51) Int. Cl.
*A61M 60/232*   (2021.01)
*A61M 60/148*   (2021.01)
*A61M 60/419*   (2021.01)
*A61M 60/824*   (2021.01)

(52) U.S. Cl.
CPC ........ *A61M 60/232* (2021.01); *A61M 60/148* (2021.01); *A61M 60/419* (2021.01); *A61M 60/824* (2021.01)

(58) Field of Classification Search
CPC .............. A61M 60/232; A61M 60/419; A61M 60/824; A61M 60/109; A61M 60/38; F04D 13/02; F04D 13/06; F04D 29/047; F04D 29/048; F16C 17/10; F16C 32/04
See application file for complete search history.

(56) References Cited

U.S. PATENT DOCUMENTS

| | | | |
|---|---|---|---|
| 4,984,972 A | | 1/1991 | Clausen et al. |
| 5,840,070 A | * | 11/1998 | Wampler ................. H02K 7/09 |
| | | | 417/423.1 |
| 6,135,710 A | * | 10/2000 | Araki .................. A61M 60/419 |
| | | | 415/206 |
| 9,068,572 B2 | | 6/2015 | Ozaki et al. |
| 9,592,326 B2 | | 3/2017 | Takatani et al. |

(Continued)

FOREIGN PATENT DOCUMENTS

JP   2002315824 A   10/2002

OTHER PUBLICATIONS

International Search Report, PCT/JP2020/011198, May 12, 2020.

*Primary Examiner* — Jessica Arble
(74) *Attorney, Agent, or Firm* — MacMillan, Sobanski & Todd, LLC

(57) ABSTRACT

A pump device includes an impeller and a housing that houses the impeller in a rotatable manner. The impeller includes a fin (vane) unit and a movable sleeve. The housing includes a fixed sleeve that houses the movable sleeve. A first gap is formed between an inner periphery of the movable sleeve and an opposing surface that faces the inner periphery. Since the inner periphery and the opposing surface are inclined relative to an axis of the impeller, the first gap is increased when the impeller ascends with rotation of the impeller.

14 Claims, 7 Drawing Sheets

(56) References Cited

U.S. PATENT DOCUMENTS

| | | | |
|---|---|---|---|
| 2008/0234623 A1* | 9/2008 | Strauss | B01D 63/02 604/6.14 |
| 2011/0238172 A1 | 9/2011 | Akdis | |
| 2015/0087889 A1* | 3/2015 | Takatani | F16C 17/02 600/16 |
| 2020/0155740 A1 | 5/2020 | Mori | |

* cited by examiner

PUMP DEVICE FOR PUMPING BLOOD

CROSS REFERENCE TO RELATED APPLICATIONS

This application is a continuation of PCT Application No. PCT/JP2020/011198, filed Mar. 13, 2020, based on and claiming priority to Japanese Application No. 2019-113877, filed Jun. 19, 2019, both of which are incorporated herein by reference in their entirety.

BACKGROUND OF THE INVENTION

The present invention relates to a pump device that causes a fluid to flow.

In a heart-lung machine that causes blood (fluid) of a patient to flow, a pump device is used as a power source for blood circulation. For example, U.S. Pat. No. 9,068,572 issued to Ozaki et al. discloses a centrifugal pump device configured to rotate an impeller disposed inside a housing so as to draw blood into the housing by a centrifugal force associated with the rotation of the impeller and to discharge the blood from the housing.

In the pump device disclosed in U.S. Pat. No. 9,068,572, magnetic coupling is formed between a motor chamber and the impeller, and the impeller is rotated while a magnet (permanent magnet) of the impeller is suctioned downward. This pump device also includes hydrodynamic grooves on upper and lower surfaces of the impeller that oppose the housing. Such a configuration causes hydrodynamic pressure above and below the impeller, thereby rotating the impeller in a balanced state.

In this type of pump device, the rotation of the impeller at a high speed increases a shear stress of a hydrodynamic gap that generates hydrodynamic pressure. Such an increase in shear stress tends to increase hemolysis of blood.

SUMMARY OF THE INVENTION

The present invention has been made in relation to the technique of the pump device. An object of the present invention is to provide a pump device that enables a fluid to flow satisfactorily by suppressing a shear stress of a hydrodynamic gap with a simple configuration.

In order to achieve the object, an aspect of the present invention provides a pump device including an impeller and a housing configured to house the impeller in a rotatable manner. The impeller includes a fin (vane) unit and a movable sleeve disposed on the opposite side of the fin (vane) unit. The housing includes a compartment configured to house the movable sleeve, in which, when the impeller is rotated, a hydrodynamic gap that generates radial hydrodynamic pressure is formed between a side surface of the movable sleeve and an opposing surface of the compartment facing the side surface, and at least one of the side surface and the opposing surface is inclined relative to an axis of the impeller to increase the hydrodynamic gap when the impeller ascends with rotation of the impeller. In another aspect, a pumping unit which pumps blood removed from a body back to the body, comprises a housing and an impeller. The housing defines a blood inflow port, a blood outflow port, and an internal space. The impeller is rotatably housed in the internal space and has an upper fin (vane) unit adapted to centrifugally pump the blood and has a lower sleeve adapted to be magnetically driven by a drive unit outside the housing. The internal space includes a cylindrically-shaped sleeve compartment configured to house the lower sleeve so that a side surface of the lower sleeve faces an opposing surface of the sleeve compartment. At least one of the side surface and the opposing surface is inclined relative to a rotational axis of the impeller to increase a hydrodynamic gap between the side surface and the opposing surface that arises when the impeller ascends in response to rotation of the impeller.

In the pump device, the impeller can be stably rotated by the hydrodynamic gap between the side surface and the opposing surface due to hydrodynamic pressure during the rotation of the impeller. Furthermore, in the pump device, at least one of the side surface and the opposing surface is inclined, so that the hydrodynamic gap is increased when the impeller ascends due to the hydrodynamic pressure, thereby suppressing a shear stress of the hydrodynamic gap. Accordingly, the pump device causes a fluid to flow satisfactorily. When the fluid flowing in the housing is blood, for example, it is possible to significantly reduce the development of hemolysis that would otherwise occur due to the shear stress.

DETAILED DESCRIPTION OF PREFERRED EMBODIMENTS

Preferred embodiments of the present invention will hereinafter be described in detail with reference to the accompanying drawings.

Figure 1:
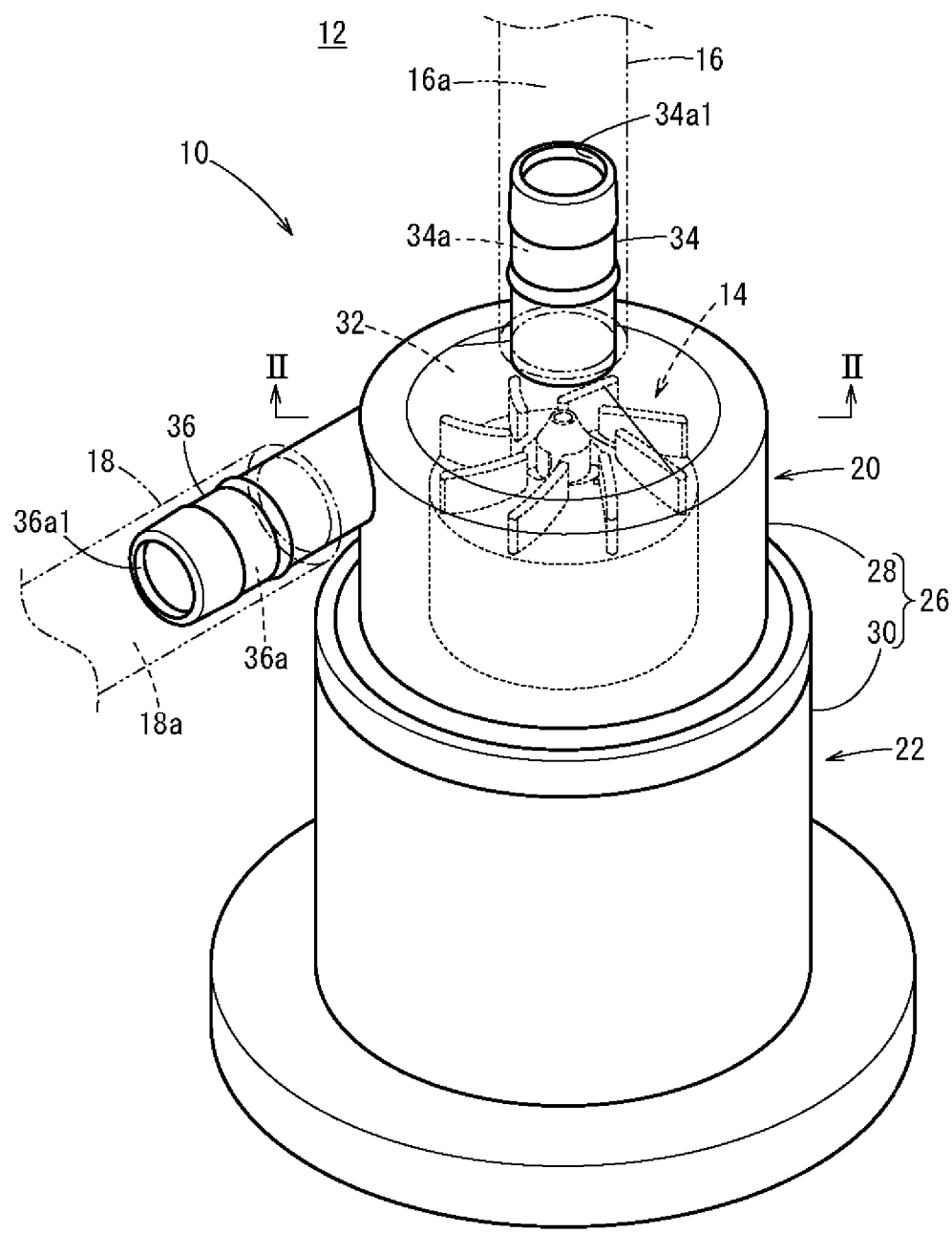
FIG. 1 is a perspective view showing an overall configuration of a pump device according to a first embodiment of the present invention.

A pump device 10 according to an embodiment of the present invention is used as a power source of a heart-lung machine 12 that assists the cardiopulmonary function of a patient (or substitutes for the heart and lungs). The pump device 10 takes blood out of the patient's body and pumps blood into the body. As shown in FIG. 1, the pump device 10 is a centrifugal pump having an impeller 14 disposed inside the device and is configured to allow a fluid to flow by a centrifugal force associated with rotation of the impeller 14.

In the heart-lung machine 12, a removal tube 16 including a removal lumen 16a and a delivery tube 18 including a delivery lumen 18a are connected to the pump device 10, thereby forming a circulation circuit for blood circulation between a patient and the machine. In assembling the heart-lung machine 12, the tip opening of the removal tube 16 is indwelled in an appropriate biological organ such as the femoral vein, and the tip opening of the delivery tube 18 is indwelled in an appropriate biological organ such as the femoral artery. The pump device 10 suctions blood from the patient through the removal lumen 16*a* and delivers blood to the patient through the delivery lumen 18*a*. In addition to the pump device 10, note that the heart-lung machine 12 may include, for example, a reservoir and an oxygenator (neither are shown) connected to intermediate positions of the circulation circuit (removal tube 16 and delivery tube 18).

Figure 2:
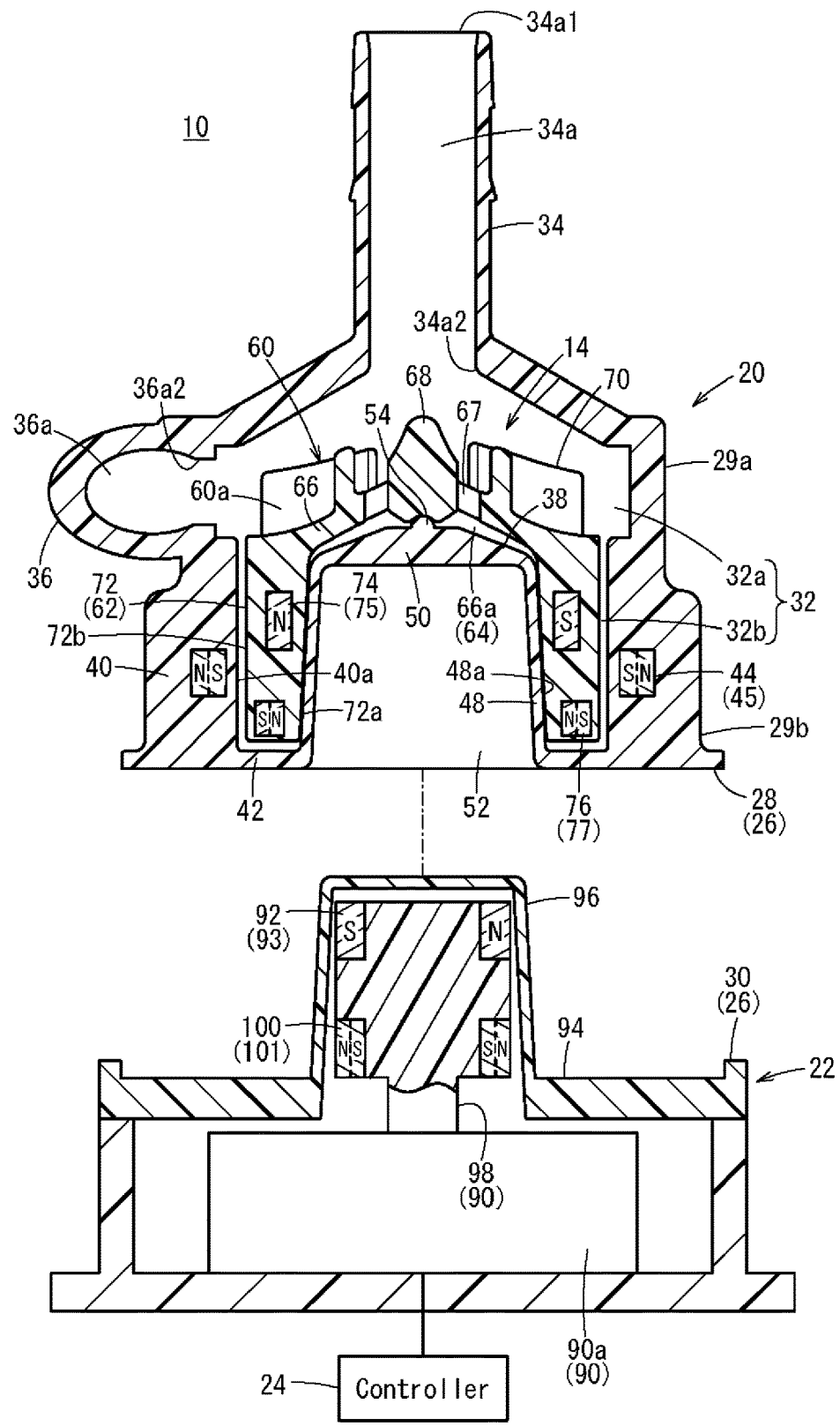
FIG. 2 is a cross-sectional view taken along line II-II of FIG. 1 showing a separated state of a pump body and a drive of the pump device.

As shown in FIG. 2, the pump device 10 includes a pump body 20 that houses the impeller 14, a drive 22 that rotates the impeller 14, and a controller 24 that controls driving of the drive 22. A housing 26 of the pump device 10 includes a resin material and is divided into a pump body housing 28 that forms the outer shape of the pump body 20 and a drive housing 30 that forms the outer shape of the drive 22.

The pump body housing 28 and the drive housing 30 are detachable from each other. Before use, the pump body housing 28 and the drive housing 30 are assembled, and drive forces of the drive 22 are transferred to the impeller 14 of the pump body 20. After use, the pump body 20 is detached from the drive 22 and discarded. In other words, the pump body 20 is a disposable member that is replaced and thrown away or sterilized every time after use. On the other hand, the drive 22 is a reusable member. When using the drive 22 again, a new pump body 20 is attached to the drive 22 to operate the impeller 14 of the pump body 20.

The pump body housing 28 of the pump body 20 include an internal space 32 where the impeller 14 is housed in a rotatable manner. Blood flows in and out of the internal space 32. The pump body housing 28 includes a fixed upper box 29*a* and a fixed lower sleeve 29*b* (forming a cylindrical compartment). The upper side of the fixed box 29*a* has a substantially conical shape and the lower side thereof has a disk shape. The fixed sleeve 29*b* is connected to a lower part of the fixed box 29*a* and has a substantially cylindrical shape.

The ceiling and the center of the fixed box 29*a* is provided with a blood inflow port 34 to be connected to the removal tube 16. The blood inflow port 34 is internally provided with an inflow path 34*a* that communicates with the internal space 32. The inflow path 34*a* communicates with an opening 34*a*1 at a protruding end of the blood inflow port 34 and communicates with an inlet 34*a*2 at the boundary between the internal space 32 and the inflow path 34*a*.

In addition, the outer periphery of the fixed box 29*a* is provided with a blood outflow port 36 to be connected to the delivery tube 18. The blood outflow port 36 protrudes tangentially from the outer periphery of the fixed box 29*a*. The blood outflow port 36 is internally provided with an outflow path 36*a* that communicates with the internal space 32. The outflow path 36*a* communicates with an opening 36*a*1 (see FIG. 1) at a protruding end of the blood outflow port 36 and communicates with an outlet 36*a*2 at the boundary between the internal space 32 and the outflow path 36*a*.

Figure 3:
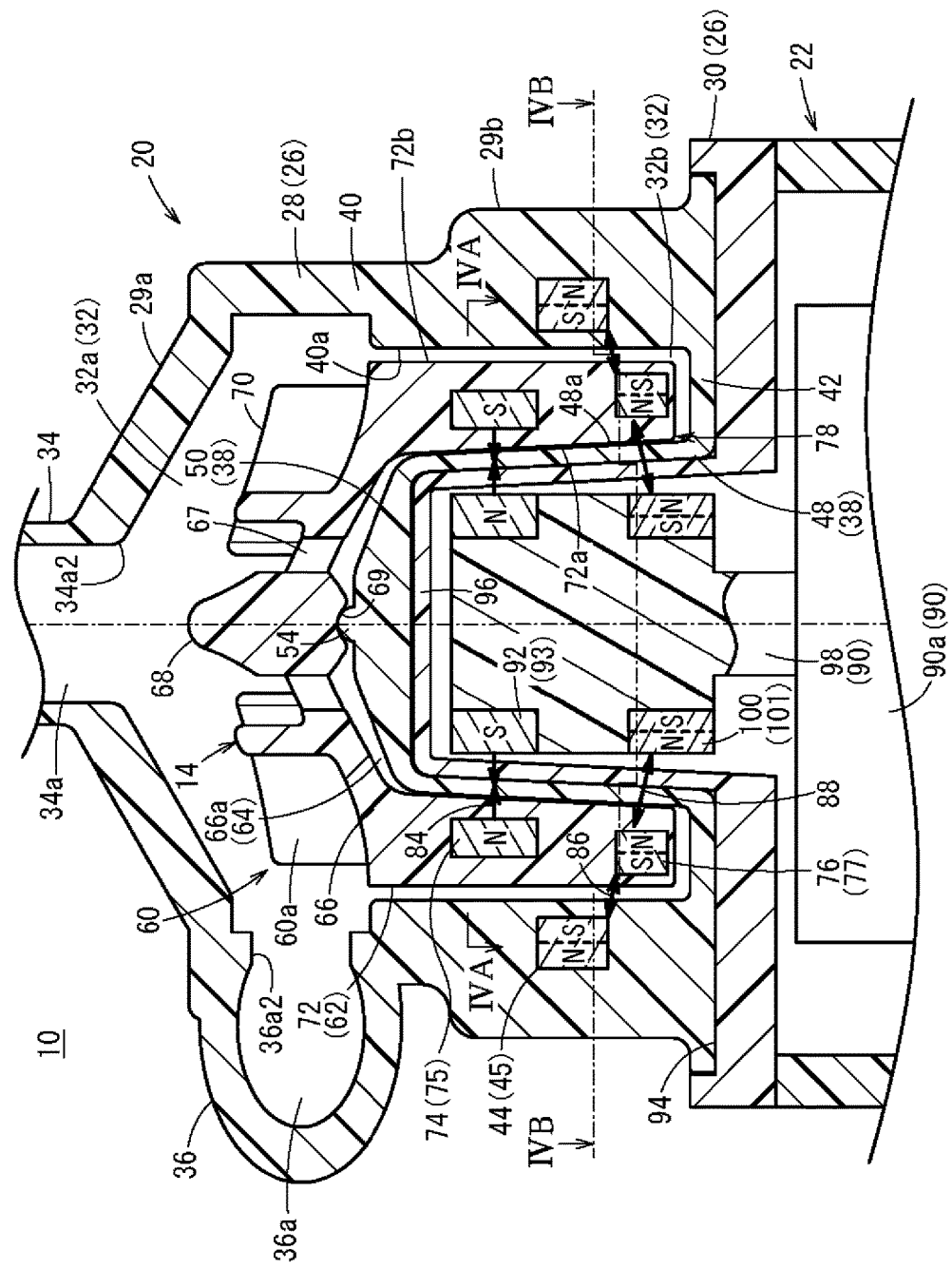
FIG. 3 is a side sectional view of main parts of the pump device.

As shown in FIG. 3, the internal space 32 has a shape corresponding to the outer shape (fixed box 29*a*, fixed sleeve 29*b*) of the pump body housing 28. The upper side of the internal space 32 (hereinafter referred to as "upper space 32*a*") is formed by the inner surface of the fixed box 29*a* and is provided with a fin (vane) unit 60 of the impeller 14. A central portion in the lower side of the upper space 32*a* includes a shaft unit 38 (i.e., central hub) of the pump body housing 28 protruding toward the inlet 34*a*2 of the blood inflow port 34.

The fixed sleeve 29*b* of the pump body housing 28 includes an outer peripheral wall 40 having a cylindrical shape, a bottom wall 42 forming the lower end of the pump body housing 28, and the shaft unit 38 disposed inside the outer peripheral wall 40. The lower side of the internal space 32 (hereinafter referred to as "lower space 32*b*") has a cylindrical shape formed by the inner surface of the fixed sleeve 29*b*. The lower space 32*b* rotatably houses a driven rotating structure 62 (to be described) of the impeller 14.

Furthermore, a first repelling magnet 44 has a ring shape and is disposed close to a lower part of the outer peripheral wall 40. The first repelling magnet 44 and an impeller repelling magnet 76 disposed in the impeller 14 repel each other to form a first repulsion mechanism 86. The first repulsion mechanism 86 will be described later.

The shaft unit 38 disposed inside the fixed sleeve 29*b* includes an inner peripheral wall 48 having a cylindrical shape and a mound-shaped portion 50 connected to the upper end of the inner peripheral wall 48. The inside of the inner peripheral wall 48 and the mound-shaped portion 50 is provided with an insertion hole 52. In other words, the lower space 32*b* revolves around the side of the insertion hole 52. The lower end of the insertion hole 52 is opened, and the drive housing 30 is inserted thereinto when the pump body 20 and the drive 22 are assembled.

The mound-shaped portion 50 of the shaft unit 38 is formed into a partially conical shape, and the top of the mound-shaped portion 50 is provided with a bearing 54 that rotatably and axially supports the impeller 14. The bearing 54 is formed into a hemispherical shape and supports the lower side of a rotary pivot 68 at the center of the impeller 14. When a line passing through the center of the bearing 54 and the apex of the hemispherical shape is extended, the center of the bearing 54 overlaps the center of the inlet 34*a*2 of the blood inflow port 34. This center also aligns with an axis St (FIGS. 4A and 4B) of the pump body housing 28 (shaft unit 38, outer peripheral wall 40).

As shown in FIGS. 1 and 3, the impeller 14 is formed into a cylindrical shape and is housed in both the upper space 32*a* and the lower space 32*b* in the pump body housing 28. An upper part of the impeller 14 includes the fin (vane) unit 60, and a lower part thereof includes the driven rotating structure 62. The inside of the fin (vane) unit 60 and the driven rotating structure 62 forms a space 64 where the shaft unit 38 is disposed.

The fin (vane) unit 60 imparts a centrifugal force to blood in the upper space 32*a* when the impeller 14 is rotated. The fin (vane) unit 60 includes a conical wall 66 connected to the upper end of the driven rotating structure 62, the rotary pivot 68 axially supported by the bearing 54 at the center of the conical wall 66, and a plurality of protruding walls 70 protruding upward from the upper surface of the conical wall 66. A space surrounded by the conical wall 66 and a pair of protruding walls 70 is a channel 60*a* having an upper part opened. Blood flows through this channel 60*a*. The fin (vane) unit 60 is not limited in shape and may be provided with, for example, a shroud (not shown) on the upper part of the protruding walls 70 to cover the channel 60*a*.

The conical wall 66 is inclined more steeply than the mound-shaped portion 50 of the pump body housing 28, and the upper surface of the conical wall 66 is curved arcuately. Such a configuration forms a gap (hereinafter referred to as "upper gap 66*a*") between the mound-shaped portion 50 and the conical wall 66. The conical wall 66 around the rotary pivot 68 is provided with a plurality of (e.g., three) washout holes 67 penetrating the conical wall 66. The washout holes 67 are long holes formed in the circumferential direction and allow the upper space 32a above the conical wall 66 and the upper gap 66a to communicate with each other for a flow of blood.

The rotary pivot 68 is smoothly connected to the conical wall 66 and is formed into a conical shape steeply inclined upward relative to the protruding walls 70. The outer periphery of lower part of the rotary pivot 68 protrudes downward and inward in an arc shape. A central portion of lower part of the rotary pivot 68 is provided with a recessed support 69 that is recessed upward. The recessed support 69 is formed into an arc-shaped recessed surface having a curvature smaller than that of the hemispherical bearing 54 and comes into contact with the bearing 54 when the impeller 14 is not being rotated. Even when the recessed support 69 and the bearing 54 are in contact with each other, the lower end surface of a movable sleeve 72 is separated from the bottom wall 42 of the pump body housing 28. The recessed support 69 ascends from the bearing 54 during rotation of the impeller 14.

The bearing structure of the impeller 14 and the pump body housing 28 is not limited to the above configuration and may employ various configurations. For example, a pin (not shown) may be disposed at the center of the pump body housing 28 and a hole (not shown) into which the pin is inserted may be disposed in the impeller 14 so as to form a bearing structure.

The plurality of protruding walls 70 of the fin (vane) unit 60 extend from positions near the outside of the washout holes 67 to the vicinity of the outer edge of the conical wall 66. Each protruding wall 70 extends in a slightly curved manner in plan view. Accordingly, when the impeller 14 is rotated, each protruding wall 70 allows blood entering the channel 60a to smoothly flow radially outward.

The driven rotating structure 62 of the impeller 14 includes the cylindrical movable sleeve 72 linked to the conical wall 66 of the fin (vane) unit 60 and has a predetermined thickness in the radial direction of the impeller 14. The movable sleeve 72 has an outer diameter in a range of, for example, 20 mm to 50 mm. This embodiment employs the impeller 14 having a diameter of 30 mm.

The movable sleeve 72 has a side surface (inner periphery 72a, outer periphery 72b) extending parallel to an axis Si (FIGS. 4A and 4B) of the impeller 14. The movable sleeve 72 is internally provided with a driven magnet 74 and the impeller repelling magnet 76.

While the pump body 20 is mounted on the drive 22, the driven magnet 74 is coplanar with a driving magnet 92 of the drive 22 and forms a magnetic coupling mechanism 84 together with the driving magnet 92. More specifically, on the upper end of the movable sleeve 72, the driven magnet 74 is fixed close to the radially inner side (inner periphery 72a) of the movable sleeve 72. An axial length (thickness) of the driven magnet 74 parallel to an axis thereof is substantially equal to an axial length of the driving magnet 92.

Figure 4A:
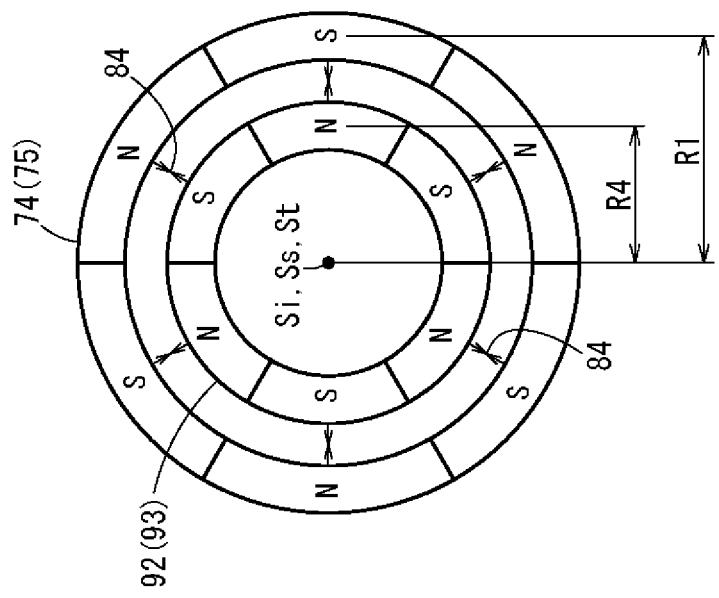
FIG. 4A is a cross-sectional view taken along line IVA-IVA of FIG. 3 showing a magnetic coupling mechanism.

As shown in FIG. 4A, the driven magnet 74 is a driven multipolar magnetized ring magnet 75 that encircles the axis Si of the impeller 14 with a constant radius R1. The driven multipolar magnetized ring magnet 75 is magnetized such that a plurality of N and S poles are alternately arranged along the circumferential direction. Examples of a material of the driven magnet 74 (driven multipolar magnetized ring magnet 75) include hard magnetic materials such as alnico, ferrite, and neodymium. The number of poles of the driven multipolar magnetized ring magnet 75 is six (that is, three opposite poles) in FIG. 4A, but the present invention is not limited thereto. The driven magnet 74 is not limited to a multipolar magnetized ring and may be formed into a ring shape by arranging a plurality of arc-shaped magnets having opposite poles (N and S poles) in the circumferential direction.

Figure 4B:
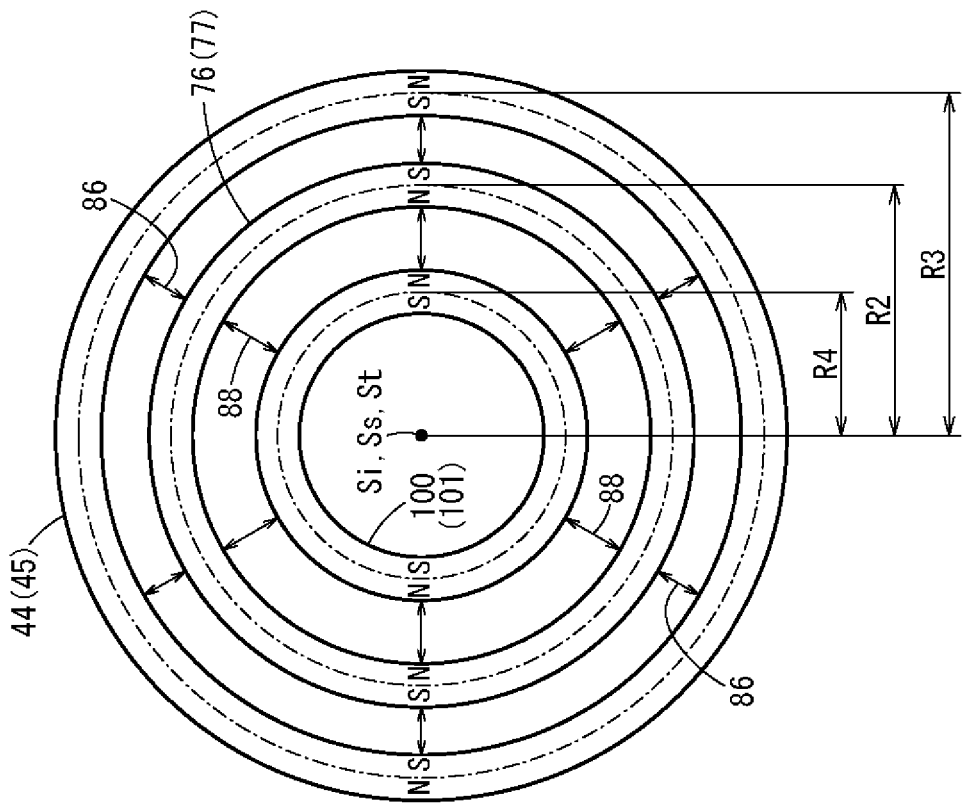
FIG. 4B is a cross-sectional view taken along line IVB-IVB of FIG. 3 showing first and second repulsion mechanisms.

As shown in FIGS. 3 and 4B, on the lower side of the driven rotating structure 62, the impeller repelling magnet 76 is fixed slightly closer to the radially outer side (outer periphery 72b) of the driven rotating structure 62. In other words, a radius R2 of the impeller repelling magnet 76 is longer than the radius R1 of the driven magnet 74. Furthermore, the driven magnet 74 and the impeller repelling magnet 76 are widely separated in the vertical direction inside the driven rotating structure 62 so as to suppress interaction between their respective magnetic fields. A shield (not shown) may be disposed between the driven magnet 74 and the impeller repelling magnet 76 to limit the mutual influence of a magnetic field.

The impeller repelling magnet 76 is an impeller inner and outer peripheral unipolar magnetized ring magnet 77 that encircles the axis Si of the impeller 14 with the constant radius R2. The impeller inner and outer peripheral unipolar magnetized ring magnet 77 is magnetized to have a first pole (S pole in FIG. 3) over the entire circumference of the outer periphery and a second pole (N pole in FIG. 3) opposite to the first pole over the entire circumference of the inner periphery. The impeller repelling magnet 76 (impeller inner and outer peripheral unipolar magnetized ring magnet 77) is not particularly limited in material and may employ those enumerated as the material of the driven magnet 74.

As described above, the first repelling magnet 44 is disposed on the outer peripheral wall 40 of the fixed sleeve 29b facing the driven rotating structure 62 of the impeller 14. The first repelling magnet 44 is placed at a position closer to the radially outer side than the impeller repelling magnet 76 and slightly above the impeller repelling magnet 76 (a position offset in a direction approaching the inlet 34a2). The lower end of the first repelling magnet 44 is above the upper end of the impeller repelling magnet 76.

The first repelling magnet 44 is an outside inner and outer peripheral unipolar magnetized ring magnet 45 that encircles the axis St of the pump body housing 28 with a constant radius R3 at a position farthest from the axis St. The outside inner and outer peripheral unipolar magnetized ring magnet 45 is magnetized to have a first pole (N pole in FIG. 3) over the entire circumference of the outer periphery and a second pole (S pole in FIG. 3) opposite to the first pole over the entire circumference of the inner periphery. The first repelling magnet 44 is also not particularly limited in material and may employ those enumerated as the material of the driven magnet 74.

The impeller repelling magnet 76 and the first repelling magnet 44 formed closer to the inlet 34a2 than the impeller repelling magnet 76 generate a repelling force (repulsive force) that pushes the impeller repelling magnet 76 radially inward and downward relative to the first repelling magnet 44. In other words, the impeller 14 is pressed by the first repulsion mechanism 86 in a direction away from the inlet 34a2 and radially inward from the entire circumferential direction. The repelling force of the first repulsion mechanism 86 is set to be larger than the attractive force of the magnetic coupling mechanism 84 when the axis Si of the impeller 14 aligns with the axis St of the pump body housing 28.

Returning to FIGS. 2 and 3, the inner periphery 72a of the movable sleeve 72 of the impeller 14 and an opposing surface 48a of the inner peripheral wall 48 of the housing 26 (pump body housing 28) form a hydrodynamic bearing 78 based on rotation of the impeller 14. The hydrodynamic bearing 78 is a journal bearing that prevents the movable sleeve 72 from contacting the inner peripheral wall 48 as a result of blood flowing between the opposing surface 48a and the inner periphery 72a during the rotation of the impeller 14.

Figure 5:
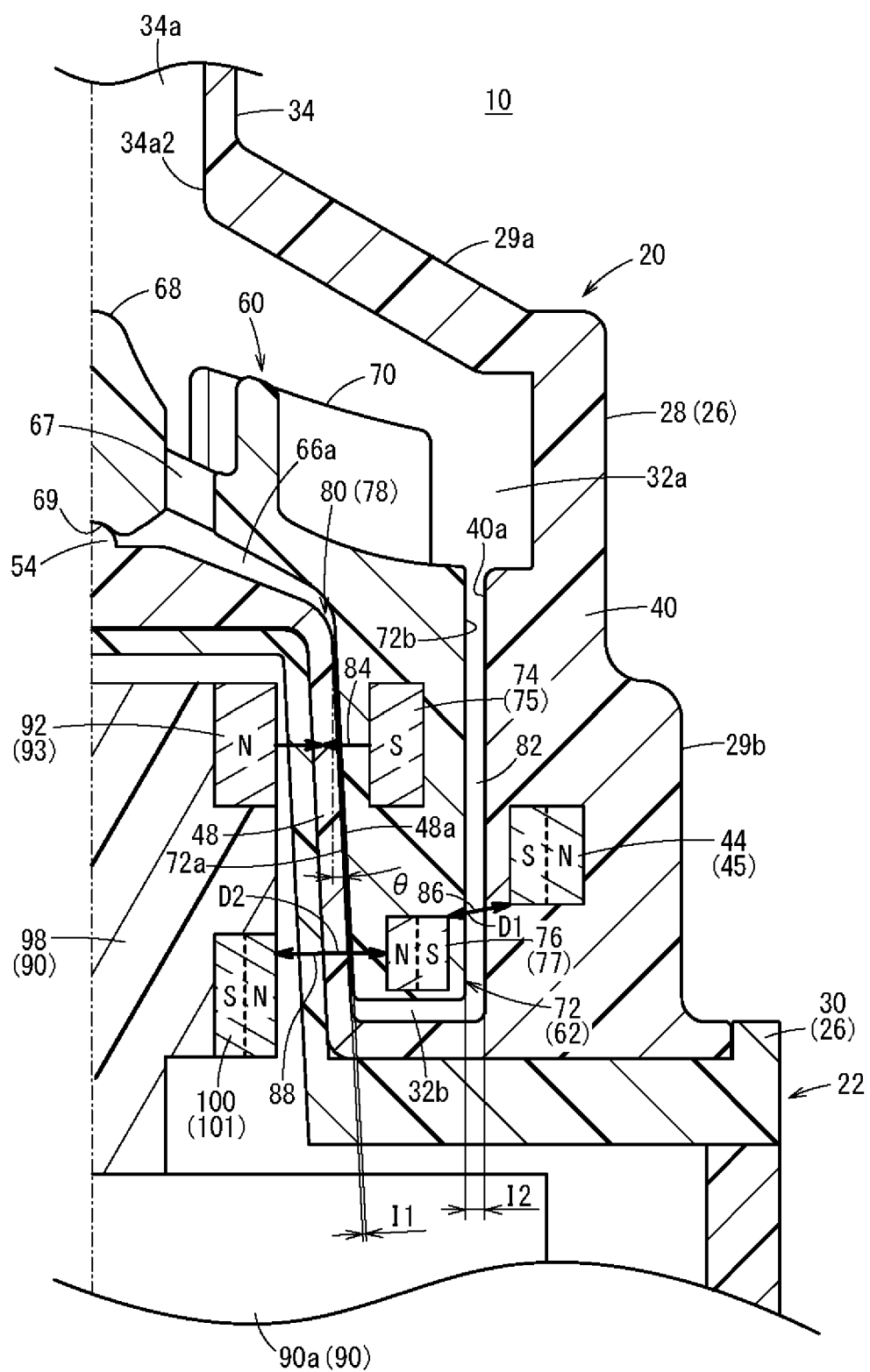
FIG. 5 is an enlarged side sectional view of an impeller and a hydrodynamic bearing of a housing.

Specifically, as shown in FIG. 5, a hydrodynamic gap (first gap 80 between the opposing surface 48a and the inner periphery 72a) of the hydrodynamic bearing 78 is set to be sufficiently smaller than a second gap 82 between the outer periphery 72b (side surface) of the movable sleeve 72 and an opposing surface 40a of the pump body housing 28 (outer peripheral wall 40). A clearance I1 of the first gap 80 when the impeller 14 is not rotated depends on the viscosity of a flowing fluid. For example, when the fluid is blood, the clearance I1 is set in a range of 50 µm to 200 µm. A clearance I2 of the second gap 82 is set in a range of, for example 0.8 mm to 1.2 mm.

The opposing surface 48a and the inner periphery 72a (first gap 80) according to this embodiment are inclined relative to the vertical axes Si and St of the impeller 14 and the shaft unit 38. In other words, the opposing surface 48a and the inner periphery 72a are formed into a tapered shape inclined radially inward toward the inlet 34a2 and extend in parallel to each other. The opposing surface 48a and the inner periphery 72a formed into such a tapered shape causes the clearance I1 of the first gap 80 to increase when the impeller 14 ascends with hydrodynamic pressure caused by high-speed rotation of the impeller 14. Note that the opposing surface 40a and the outer periphery 72b forming the second gap 82 extend in parallel to the axes Si and St (e.g., are vertical).

Inclination angles θ of the opposing surface 48a and the inner periphery 72a relative to the axes Si and St may be in a range of, for example, about 0.05° to 0.1°, depending on the dimensions of the impeller 14 and the housing 26. Setting the inclination angles θ in this range makes it possible to increase the clearance I1 of the first gap 80 by about 50 µm, for example, when the impeller 14 ascends by about 1 mm from a lower resting position when the rotation is stopped. With an inclination angle θ smaller than 0.05°, the clearance I1 of the first gap 80 hardly changes even when the impeller 14 ascends. Conversely, an inclination angle θ larger than 0.1° weakens radial hydrodynamic pressure, thereby causing an unstable rotational position of the impeller 14. The tapered opposing surface 48a and inner periphery 72a may linearly increase the clearance I1 of the first gap 80 in proportion to an increase in rotational speed of the impeller 14.

When the impeller 14 is not rotated (i.e., is at the lower rest position), a length at which the inner periphery 72a and the opposing surface 48a face each other while being inclined is preferably in a range of 10 mm to 100 mm. Such a configuration appropriately offers stable hydrodynamic pressure even when the impeller 14 ascends.

As shown in FIGS. 1 to 3, the drive 22 of the pump device 10 includes the drive housing 30 and a motor mechanism 90 housed in the drive housing 30. The drive 22 also includes the driving magnet 92 and a second repelling magnet 100 disposed in the motor mechanism 90 and configured to attract the impeller 14 mutually.

The drive housing 30 has the upper surface provided with an annular mounting groove 94 on which the pump body 20 (pump body housing 28) is mounted. A portion closer to the radially inner side than the mounting groove 94 of the drive housing 30 is a central protrusion 96 which is to be inserted into the insertion hole 52 of the pump body housing 28. The pump body housing 28 of the pump body 20 and the drive housing 30 of the drive 22 are engaged by inserting the central protrusion 96 into the insertion hole 52 and inserting the bottom wall 42 into the mounting groove 94. It is needless to say that the engagement structure of the pump body 20 and the drive 22 is not particularly limited.

The drive housing 30 is internally provided with a motor body 90a of the motor mechanism 90. The motor body 90a rotates a rotator 98 at an appropriate rotational speed under control of the controller 24. The rotator 98 protrudes from the motor body 90a and is inserted into a protruding space inside the central protrusion 96. An upper part of the rotator 98 bulges radially outward. While the pump body 20 is mounted on the drive 22, the axis Si of the impeller 14 and an axis Ss of the rotator 98 overlap each other.

When the upper part of the rotator 98 is viewed in side section, upper and lower parts of the outer periphery on the radially outer side are cut out to hold the driving magnet 92 and the second repelling magnet 100. Specifically, while the driving magnet 92 is fixed to a protruding end of the rotator 98, the second repelling magnet 100 is fixed to a lower part of the bulging portion of the rotator 98. The driving magnet 92 and the second repelling magnet 100 rotate in an integrated manner with the rotator 98.

As shown in FIG. 4A, the driving magnet 92 is a drive multipolar magnetized ring magnet 93 that encircles the axis Ss of the rotator 98 with a radius R4 shorter than the radius R1 of the driven magnet 74. Similarly to the driven magnet 74, the drive multipolar magnetized ring magnet 93 is magnetized such that a plurality of (six) poles (N and S poles) are alternately arranged along the circumferential direction. While the pump body 20 is mounted on the drive 22, the driving magnet 92 faces the driven magnet 74 on the radially inner side of the driven magnet 74, thereby forming the magnetic coupling mechanism 84 together with the driven magnet 74.

A material included in the driving magnet 92 can be appropriately selected from those enumerated as the material of the driven magnet 74. The driving magnet 92 is not limited to the multipolar magnetized ring magnet and may be formed into a ring shape by arranging a plurality of arc-shaped magnets having opposite poles (N and S poles) in the circumferential direction.

As shown in FIG. 4B, the second repelling magnet 100 and the impeller repelling magnet 76 repel each other to form a second repulsion mechanism 88. The second repelling magnet 100 is an inside inner and outer peripheral unipolar magnetized ring magnet 101 that revolves about the axis Ss of the rotator 98 with the same radius R4 as the driving magnet 92. The inside inner and outer peripheral unipolar magnetized ring magnet 101 is magnetized to have a first pole (N pole in FIG. 3) over the entire circumference of the outer periphery and a second pole (S pole in FIG. 3) opposite to the first pole over the entire circumference of the inner periphery. The second repelling magnet 100 is also not particularly limited in material and may employ those enumerated as the material of the driven magnet 74.

Note that the first repelling magnet 44, the impeller repelling magnet 76, and the second repelling magnet 100 are not limited to a unipolar magnetized ring and may be formed into a ring shape by arranging a plurality of arc-shaped magnets having opposite poles on the inner periphery and the outer periphery in the circumferential direction.

The second repelling magnet 100 is placed slightly below the impeller repelling magnet 76 (at a position offset in a direction away from the inlet 34a2) when the pump body 20 is mounted on the drive 22. Accordingly, the impeller repelling magnet 76 and the second repelling magnet 100 generate a repelling force (repulsive force) that pushes the impeller repelling magnet 76 radially outward relative to the second repelling magnet 100 and toward the inlet 34a2.

A first distance D1 (shortest distance) between the impeller repelling magnet 76 and the first repelling magnet 44 is shorter than a second distance D2 (shortest distance) between the impeller repelling magnet 76 and the second repelling magnet 100 (FIG. 5). On the other hand, an axial length of the second repelling magnet 100 is formed longer than an axial length of the first repelling magnet 44 to generate a large magnetic flux density between the impeller repelling magnet 76 and the second repelling magnet 100. The second repulsion mechanism 88 configured as described above applies an upward repelling force to the impeller 14 when the rotation of the impeller 14 is stopped, but the impeller 14 is balanced by the first repulsion mechanism 86 to such an extent that the impeller 14 does not ascend so high from the bearing 54.

Returning to FIG. 2, the controller 24 of the pump device 10 includes a known computer provided with an input and output interface, memory, and processor (not shown) and controls driving of the motor mechanism 90. A monitor, speaker, operation button, and the like (not shown) are disposed on the outer surface of the controller 24. A user such as a doctor and nurse manipulates the operation button to set driving details of the pump device 10. The controller 24 controls the power supply of the battery based on the information set by the user and rotates the rotator 98 in a range of, for example, 0 to 10000 rpm.

The pump device 10 according to this embodiment is basically configured in this manner. Hereinafter, operations of the pump device 10 will be described.

The heart-lung machine 12 including the pump device 10 is assembled for a patient who requires assistance in cardiopulmonary function. When assembling the heart-lung machine 12, a user connects the removal tube 16 to the blood inflow port 34 of the pump body 20 and connects the delivery tube 18 to the blood outflow port 36 of the pump body 20. The first repelling magnet 44 and the impeller repelling magnet 76 of the pump body 20 repel each other to form the first repulsion mechanism 86. Accordingly, in the pump body 20 alone, the impeller 14 is pressed in a direction away from the inlet 34a2 of the pump body housing 28, and the rotary pivot 68 of the impeller 14 is prevented from being displaced from the bearing 54 when, for example, the pump body 20 is transported.

As shown in FIG. 2, the pump device 10 is assembled by mounting the pump body 20 on the drive 22. In the mounted state, as shown in FIG. 3, the driven magnet 74 and the driving magnet 92 radially adjacent to each other form the magnetic coupling mechanism 84 with different poles facing each other. The magnetic coupling mechanism 84 generates a magnetic coupling force and transmits a torque of the rotator 98 to the impeller 14.

Furthermore, in the mounted state, the impeller repelling magnet 76 of the impeller 14 and the second repelling magnet 100 of the drive 22 repel each other to form the second repulsion mechanism 88. In other words, in the housing 26, the first repulsion mechanism 86 applies an even repelling force from the outside of the impeller 14 to the inside in the entire circumferential direction, and the second repulsion mechanism 88 applies an even repelling force from the inside of the impeller 14 to the outside in the entire circumferential direction. Accordingly, the impeller 14 is subject to the repelling forces from the inside and outside in the entire circumferential direction, and the position of the impeller 14 is corrected such that the axis Si of the impeller 14 becomes aligned with the axis St of the pump body housing 28.

The second repelling magnet 100 pushes out the impeller repelling magnet 76 outward and upward (in a direction approaching the inlet 34a2). Accordingly, the recessed support 69 of the impeller 14 easily ascends from the bearing 54. In this embodiment, when the impeller 14 is in the mounted state and is not rotated, the impeller 14 comes into contact with the bearing 54, but the present invention is not limited thereto. A repelling force of the second repulsion mechanism 88 may be set such that the impeller 14 ascends slightly from the bearing 54 in the non-rotating state.

When the motor mechanism 90 of the drive 22 rotates the rotator 98, the pump device 10 rotates the impeller 14 inside the pump body housing 28 via the magnetic coupling mechanism 84. Accordingly, the fin (vane) unit 60 rotating inside the upper space 32a generates a centrifugal force to cause a blood flow.

Figure 6:
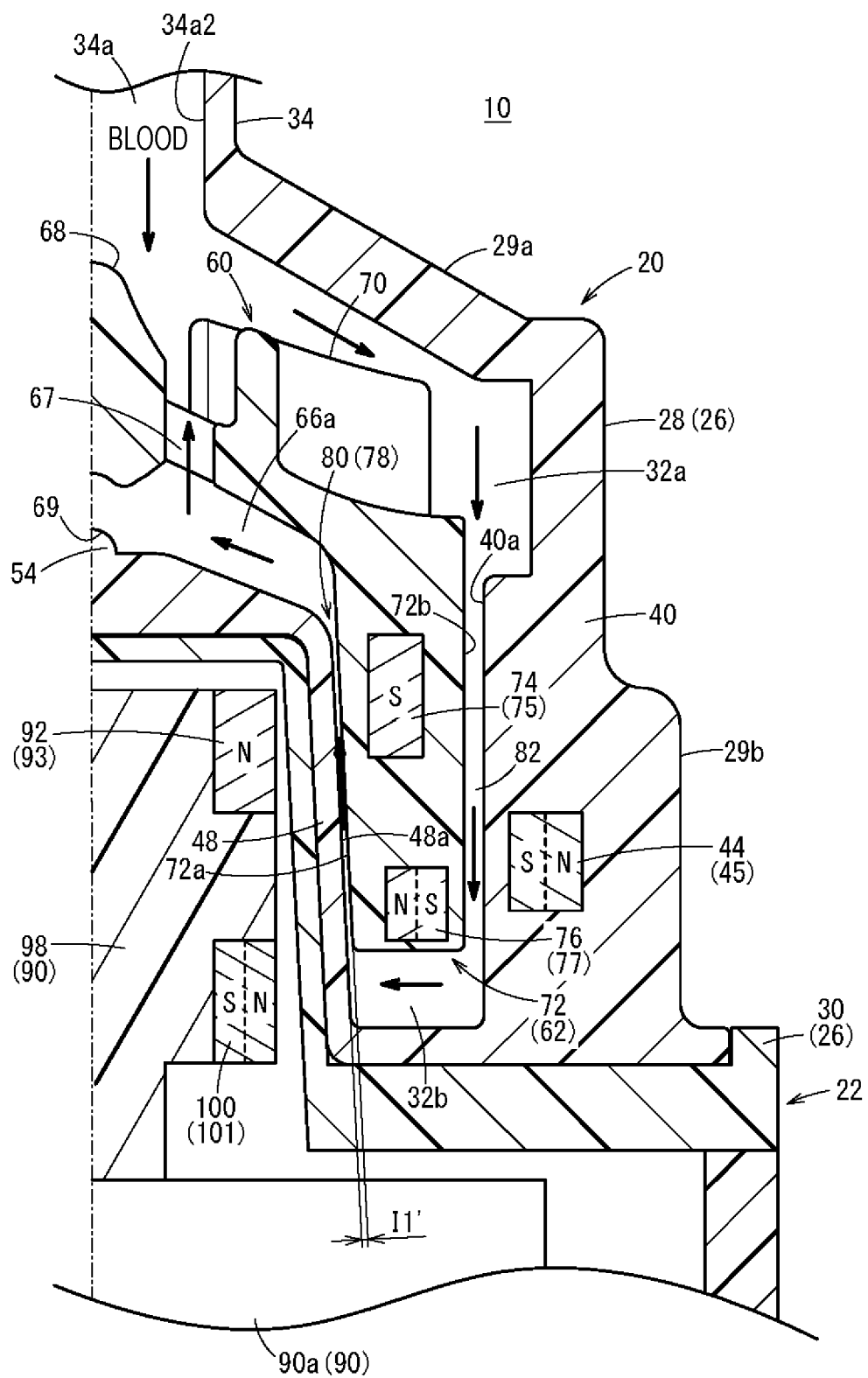
FIG. 6 is an enlarged side sectional view of the hydrodynamic bearing when the impeller is rotated at a high speed.

As shown in FIG. 6, when the impeller 14 is rotated, blood flowing into the internal space 32 from the inflow path 34a comes around the lower space 32b from the radially outer side of the upper space 32a. When the blood flows downward through the second gap 82 between the outer peripheral wall 40 and the driven rotating structure 62, the blood flows radially inward on the side close to the lower end of the lower space 32b (between the lower end surface of the movable sleeve 72 and the bottom wall 42). The blood then flows upward through the first gap 80 between the shaft unit 38 and the driven rotating structure 62, reaches the upper gap 66a, and returns to the upper space 32a through the washout holes 67.

When the impeller 14 is rotating, the hydrodynamic bearing 78 is formed by blood flowing through the first gap 80. The hydrodynamic bearing 78 generates radial hydrodynamic pressure, thereby keeping the impeller 14 from touching the shaft unit 38 and making the axis Si of the impeller 14 coincide with the axis St of the pump body housing 28.

Here, in the internal space 32 of the pump body 20, the pressure on the outlet 36a2 of the internal space 32 decreases with blood flowing out of the outflow path 36a. On the other hand, in the pump device 10, the position of the axis Si of the impeller 14 is made to follow the axis St by the first and second repulsion mechanisms 86 and 88 and the hydrodynamic bearing 78. Accordingly, it is possible to prevent a position change that lowers the vicinity of the outlet 36a2, thereby causing blood to flow satisfactorily. In addition, even when the impeller 14 ascends to the side close to the inlet 34a2 due to high-speed rotation or the like, the impeller 14 is subject to a repelling force of the first repulsion mechanism 86 (first repelling magnet 44), and the impeller 14 is controlled not to ascend more than necessary.

Furthermore, when the impeller 14 is rotated at a high speed (for example, at 3000 rpm or more), the impeller 14 ascends to the side close to the inlet 34a2, thereby increasing the clearance I1 of the first gap 80 between the opposing surface 48a and the inner periphery 72a to a clearance I1'. This increased clearance suppresses a shear stress generated in the first gap 80 with the high-speed rotation of the impeller 14. Accordingly, it is possible to significantly reduce hemolysis that is likely to be caused by the shear stress.

The present invention is not limited to the above embodiments and can be modified in various ways according to the gist of the invention. For example, in this embodiment, the opposing surface 48a of the housing 26 and the inner periphery 72a of the impeller 14 are parallel to each other, being inclined at the same inclination angle θ, and the first gap 80 has at a constant clearance. However, the opposing surface 48a and the inner periphery 72a forming the hydrodynamic bearing 78 may have different inclination angles θ (that is, the opposing surface 48a and the inner periphery 72a may not be parallel to each other). For example, an inclination angle θ of the opposing surface 48a relative to the axis Si may be larger than an inclination angle θ of the inner periphery 72a. Accordingly, it is possible to increase the clearance I1 of the first gap 80 when the impeller 14 ascends.

In addition, for example, the pump device 10 may not include one or both of the first and second repulsion mechanisms 86 and 88. Appropriately setting hydrodynamic pressure of the hydrodynamic bearing 78 makes it possible to prevent a position change during the rotation of the impeller 14.

Furthermore, the first repelling magnet 44 and the second repelling magnet 100 are not particularly limited in position. For example, the first repelling magnet 44 may be disposed not only in the pump body 20 (pump body housing 28) but also in the drive 22 (drive housing 30). Conversely, the second repelling magnet 100 may be disposed not only in the drive 22 (rotator 98) but also in the pump body 20 (pump body housing 28).

Hereinafter described are several modifications of the present invention. In the following description, the same reference numerals are given to elements having the same configurations or the same functions as those described in the above embodiment, and detailed description thereof will be omitted.

Figure 7A:
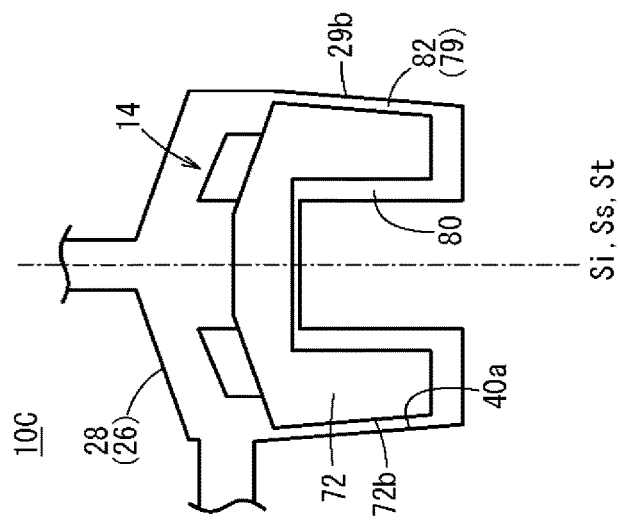
FIG. 7A is a schematic view of a pump device according to a first modification.

As shown in FIG. 7A, in a pump device 10A according to a first modification, an inner periphery 72a of a movable sleeve 72 of an impeller 14 is inclined relative to an axis Si while an opposing surface 48a of a fixed sleeve 29b of a housing 26 is parallel to the axis Si. In this manner, even when the inner periphery 72a is inclined, it is possible to increase a clearance I1 of a first gap 80 of a hydrodynamic bearing 78 when the impeller 14 ascends, and it is possible to obtain effects similar to those obtained in the pump device 10.

Figure 7B:
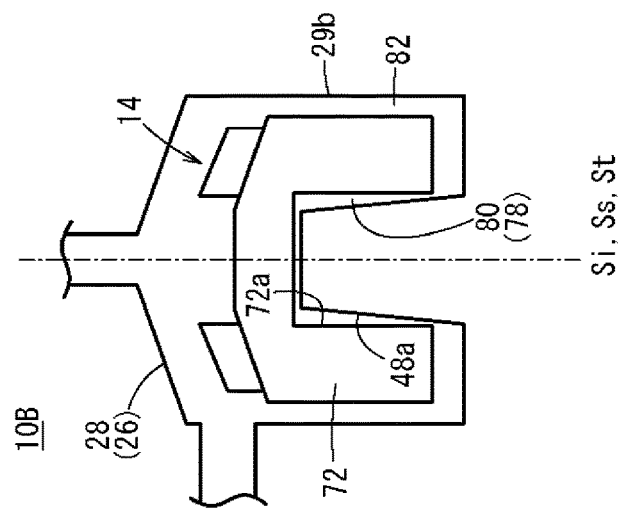
FIG. 7B is a schematic view of a pump device according to a second modification.

As shown in FIG. 7B, in a pump device 10B according to a second modification, an opposing surface 48a of a fixed sleeve 29b of a housing 26 is inclined relative to an axis Si while an inner periphery 72a of a movable sleeve 72 of an impeller 14 is parallel to the axis Si. In this manner, even when the opposing surface 48a is inclined, it is possible to increase a clearance I1 of a first gap 80 of a hydrodynamic bearing 78 when the impeller 14 ascends, and it is possible to obtain effects similar to those obtained in the pump device 10.

Figure 7C:
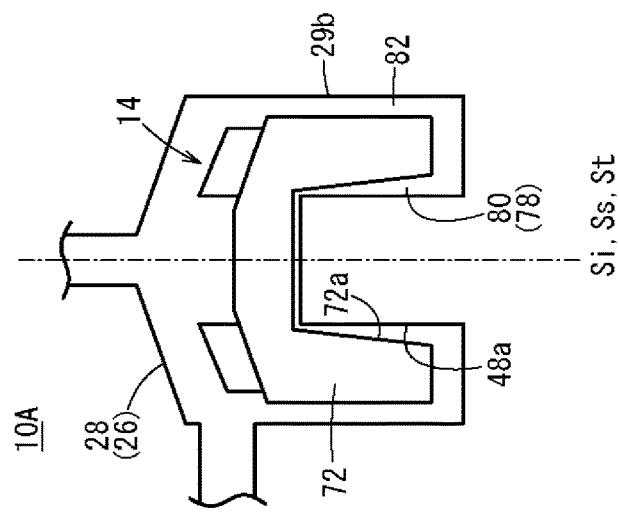
FIG. 7C is a schematic view of a pump device according to a third modification.

As shown in FIG. 7C, a pump device 10C according to a third modification forms a hydrodynamic bearing 79 in a second gap 82 between an opposing surface 40a of an outer peripheral wall 40 of a housing 26 (fixed sleeve 29b) and an outer periphery 72b (side surface) of a movable sleeve 72 of an impeller 14. The opposing surface 40a and the outer periphery 72b are formed into a tapered shape inclined relative to an axis Si. Specifically, the opposing surface 40a and the outer periphery 72b are inclined, spreading radially outward toward an inlet 34a2.

In this manner, the hydrodynamic bearing 79 is formed on the radially outer side of the impeller 14, and the hydrodynamic bearing 79 is inclined, thereby increasing a clearance 12 of a hydrodynamic gap (second gap 82) when the impeller 14 ascends. Such a configuration makes it possible to obtain effects similar to those obtained in the pump device 10. Note that the hydrodynamic bearing 79 formed on the radially outer side of the impeller 14 may be configured such that only one of the opposing surface 40a and the outer periphery 72b is inclined as in the first and second modifications.

Technical ideas and effects that can be understood from the above embodiments will be described below.

An aspect of the present invention provides a pump device 10, 10A, 10B, or 10C including an impeller 14; and a housing 26 configured to house the impeller 14 in a rotatable manner. The impeller 14 includes a fin (vane) unit 60 and a movable sleeve 72 disposed on the opposite side of the fin (vane) unit 60, and the housing 26 including a sleeve compartment (fixed sleeve 29b) configured to house the movable sleeve 72, in which, when the impeller 14 is rotated, a hydrodynamic gap (first gap 80, second gap 82) that generates radial hydrodynamic pressure is formed between a side surface (inner periphery 72a, outer periphery 72b) of the movable sleeve 72 and an opposing surface 40a or 48a of the sleeve compartment facing the side surface. At least one of the side surface, the opposing surface 40a, and the opposing surface 48a is inclined relative to an axis Si of the impeller 14 to increase the hydrodynamic gap when the impeller 14 ascends with rotation of the impeller 14.

In each of the pump devices 10 and 10A to 10C, the impeller 14 can be stably rotated by the hydrodynamic gap (first gap 80, second gap 82) between the side surface (inner periphery 72a, outer periphery 72b) and the opposing surface 40a or 48a due to hydrodynamic pressure during the rotation of the impeller 14. Furthermore, in each of the pump devices 10 and 10A to 10C, at least one of the side surface, the opposing surface 40a, and the opposing surface 48a is inclined, so that the hydrodynamic gap is increased when the impeller 14 ascends due to the hydrodynamic pressure, thereby suppressing a shear stress of the hydrodynamic gap. Accordingly, each of the pump devices 10 and 10A to 10C causes a fluid to flow satisfactorily. When the fluid flowing in the housing 26 is blood, for example, it is possible to significantly reduce the development of hemolysis due to the shear stress.

The side surface (inner periphery 72a, outer periphery 72b) and the opposing surface 40a or 48a are preferably inclined in parallel to each other. Accordingly, the pump devices 10 and 10C are configured to have a constant clearance while the hydrodynamic gap (first gap 80, second gap 82) is inclined along the axial direction of the impeller 14. Therefore, even when the impeller 14 ascends, the pump devices 10 and 10C suppress a shear stress while preferably maintaining a rotational position by the hydrodynamic pressure.

The hydrodynamic gap (first gap 80) is formed inside the movable sleeve 72. Accordingly, the pump devices 10, 10A, and 10B smoothly guide a fluid flowing outside the movable sleeve 72 to the hydrodynamic gap in the inner side and sufficiently exert the hydrodynamic pressure in the hydrodynamic gap to stably rotate the impeller 14.

The inclined side surface (inner periphery 72a, outer periphery 72b) and the opposing surface 40a or 48a have an inclination angle θ relative to the axis Si of the impeller 14 in a range of 0.05° to 0.1°. Accordingly, in each of the pump devices 10 and 10A to 10C, when the impeller 14 ascends with the rotation, a clearance of the hydrodynamic gap (first gap 80, second gap 82) is appropriately increased, thereby suppressing a shear stress efficiently.

The hydrodynamic gap (first gap 80, second gap 82) has a clearance in a range of 50 μm to 200 μm. In each of the pump devices 10 and 10A to 10C, the impeller 14 is axially supported in a stable manner and rotated by the hydrodynamic bearings 78 and 79 formed between the housing 26 and the impeller 14.

In addition, the housing 26 includes the hemispherical bearing 54, and the impeller 14 includes the recessed support 69 that comes into contact with the bearing 54 when the rotation of the impeller 14 is stopped and ascends from the bearing 54 when the impeller 14 is rotated. Accordingly, in each of the pump devices 10 and 10A to 10C, it is possible to easily ascend the impeller 14 when the impeller 14 is rotated, thereby preventing the development of hemolysis between the bearing 54 and the recessed support 69.

The impeller 14 includes the ring-shaped impeller repelling magnet 76 along the circumferential direction of the movable sleeve 72, and the housing 26 includes the fixed repelling magnet (first repelling magnet 44, second repelling magnet 100) that repels the impeller repelling magnet 76 mutually. Accordingly, in each of the pump devices 10 and 10A to 10C, the impeller repelling magnet 76 and the fixed repelling magnet repel each other, and the impeller 14 is rotated more stably by the repulsion mechanism and the hydrodynamic gap.

What is claimed is:

1. A pump device comprising:
an impeller having an arc-shaped recess; and
a housing configured to house the impeller in a rotatable manner, wherein the housing has a bearing from which the arc-shaped recess ascends;
wherein the impeller includes a vane unit and a movable sleeve disposed on the opposite side of the vane unit;
wherein the housing includes a sleeve compartment configured to house the movable sleeve so that a side surface of the movable sleeve faces an opposing surface of the sleeve compartment;
wherein the housing and impeller include sets of mutually repelling magnets such that the impeller ascends in a balanced state between a first repulsion mechanism, including a first repelling magnet and an impeller repelling magnet, and a second repulsion mechanism, including a second repelling magnet and the impeller repelling magnet;
wherein the impeller is ascended in a non-rotating state and additionally ascends during a rotating state;
wherein, when the impeller is rotated, a hydrodynamic gap that generates radial hydrodynamic pressure is formed between the side surface of the movable sleeve and the opposing surface of the sleeve compartment facing the side surface; and
wherein at least one of the side surface and the opposing surface is inclined relative to an axis of the impeller to increase the hydrodynamic gap when the impeller ascends in response to rotation of the impeller with a reduction in shear stress along the hydrodynamic gap.

2. The pump device according to claim 1:
wherein the side surface and the opposing surface are inclined in parallel to each other.

3. The pump device according to claim 1:
wherein the hydrodynamic gap is formed inside the movable sleeve.

4. The pump device according to claim 1:
wherein the side surface and the opposing surface are inclined relative to the axis of the impeller by an inclination angle in a range of 0.05° to 0.1°.

5. The pump device according to claim 1:
wherein the hydrodynamic gap during non-rotation of the impeller has a clearance of 50 μm to 200 μm.

6. The pump device according to claim 1:
wherein the mutually repelling magnets includes the impeller repelling magnet having a ring shape along a circumferential direction of the movable sleeve; and
wherein the mutually repelling magnets includes the first repelling magnet and the second repelling magnet both having a ring shape that repels the impeller repelling magnet mutually.

7. A pumping unit for pumping blood removed from a body back to the body, comprising:
a housing defining a blood inflow port, a blood outflow port, and an internal space, wherein the housing has a bearing; and
an impeller rotatably housed in the internal space and having an upper vane unit adapted to centrifugally pump the blood and having a lower sleeve adapted to be magnetically driven by a drive unit outside the housing, wherein the impeller includes an arc-shaped recess which ascends from the bearing;
wherein the housing and impeller include sets of mutually repelling magnets such that the impeller ascends in a balanced state between a first repulsion mechanism, including a first repelling magnet and an impeller repelling magnet, and a second repulsion mechanism, including a second repelling magnet and the impeller repelling magnet;
wherein the impeller is ascended in a non-rotating state and additionally ascends during a rotating state;
wherein the internal space includes a cylindrically-shaped sleeve compartment configured to house the lower sleeve so that a side surface of the lower sleeve faces an opposing surface of the sleeve compartment; and
wherein at least one of the side surface and the opposing surface is inclined relative to a rotational axis of the impeller to increase a hydrodynamic gap between the side surface and the opposing surface when the impeller ascends in response to rotation of the impeller with a reduction in shear stress along the hydrodynamic gap.

8. The pumping unit according to claim 7:
wherein the side surface and the opposing surface are inclined in parallel to each other.

9. The pumping unit according to claim 7:
wherein the hydrodynamic gap is formed inside the lower sleeve.

10. The pumping unit according to claim 7:
wherein the side surface and the opposing surface are inclined relative to the rotational axis of the impeller by an inclination angle in a range of 0.05° to 0.1°.

11. The pumping unit according to claim 7:
wherein the hydrodynamic gap during non-rotation of the impeller has a clearance of 50 μm to 200 μm.

12. The pumping unit according to claim 7:
wherein the mutually repelling magnets includes the impeller repelling magnet having a ring shape along a circumferential direction of the movable sleeve; and
wherein the mutually repelling magnets includes the first repelling magnet and the second repelling magnet both having a ring shape that repels the impeller repelling magnet mutually.

13. A pump for pumping blood removed from a body back to the body, comprising:
- a drive unit having a rotating structure carrying a drive magnet adapted to create a magnetic coupling force; and
- a pumping unit adapted to assemble onto the drive unit comprising:
  - a housing defining a blood inflow port, a blood outflow port, and an internal space, wherein the housing has a bearing; and
  - an impeller rotatably housed in the internal space and having an upper vane unit adapted to centrifugally pump the blood and having a lower sleeve adapted to be magnetically driven by the drive unit, wherein the impeller includes an arc-shaped recess which ascends from the bearing;
  - wherein the housing and impeller include sets of mutually repelling magnets such that the impeller ascends in a balanced state between a first repulsion mechanism, including a first repelling magnet and an impeller repelling magnet, and a second repulsion mechanism, including a second repelling magnet and the impeller repelling magnet;
  - wherein the impeller is ascended in a non-rotating state and additionally ascends during a rotating state;
  - wherein the internal space includes a cylindrically-shaped sleeve compartment configured to house the lower sleeve so that a side surface of the lower sleeve faces an opposing surface of the sleeve compartment; and
  - wherein at least one of the side surface and the opposing surface is inclined relative to a rotational axis of the impeller to increase a hydrodynamic gap between the side surface and the opposing surface that arises when the impeller ascends in response to rotation of the impeller with a reduction in shear stress along the hydrodynamic gap.

14. The pump of claim 13 wherein the at least one of the side surface and the opposing surface is inclined relative to a rotational axis of the impeller in a range of 0.05° to 0.1°.

* * * * *